Nov. 20, 1962     C. F. MOONEY     3,064,401

METHOD OF MAKING ASPHERIC OPTICAL ELEMENTS

Filed Sept. 2, 1960

CHARLES F. MOONEY
*INVENTOR.*

BY Hoffman Stone

Frank C. Parker

*ATTORNEYS*

United States Patent Office 3,064,401
Patented Nov. 20, 1962

3,064,401
METHOD OF MAKING ASPHERIC OPTICAL ELEMENTS
Charles F. Mooney, Irondequoit, N.Y., assignor to Bausch & Lomb Incorporated, Rochester, N.Y., a corporation of New York
Filed Sept. 2, 1960, Ser. No. 53,730
9 Claims. (Cl. 51—284)

This invention relates to an improved method of making optical elements having surfaces that depart by relatively small, controlled amounts from regular plano, spherical, circular toric, or circular cylindrical curvature.

It is well known that certain optical aberrations, notably the so-called spherical aberrations may be corrected by incorporating an aspheric surface in the optical system. The degree of departure from true sphericity, or in the case of anamorphic systems, from true circular cylindrical curvature required for such correction is often relatively small for well designed optical systems. Previous attempts to produce elements having such aspheric surfaces, however, have proved to be commercially impracticable, largely because of cost factors. There has heretofore been no way economically to produce such elements of optical quality comparable to more regularly shaped optical elements, that is, having sufficient excellence of surface condition and freedom from waviness and other types of surface irregularities.

Accordingly, the principal object of the present invention is to provide an improved method whereby so-called aspheric optical elements may be made inexpensively and of comparable quality to elements of circular cross-sectional configuration.

The foregoing, and other objects and advantages of the invention will become apparent in the following detailed description of representative embodiments thereof, taken in conjunction with the drawing, wherein the surface configurations of the various parts illustrated have been exaggerated for clarity of showing, and:

Figure 1:
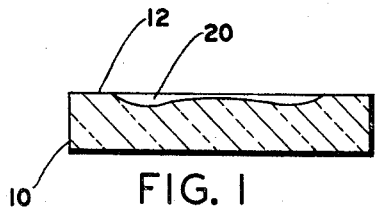
FIG. 1 is a cross-sectional view of a mold for use in the practice of the invention.
Figure 2:
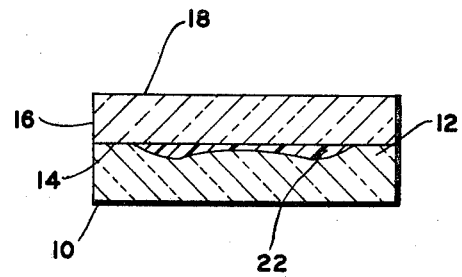
FIG. 2 is a cross-sectional view of the mold shown in FIG. 1, along with a blank workpiece as they appear during one stage of the process.
Figure 3:
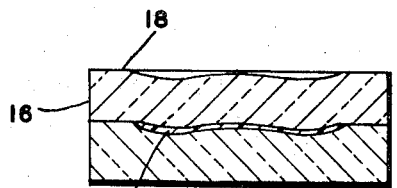
FIG. 3 is a view generally similar to the view of FIG. 2 showing the workpiece and mold as they appear during a later stage of the process.
Figure 4:
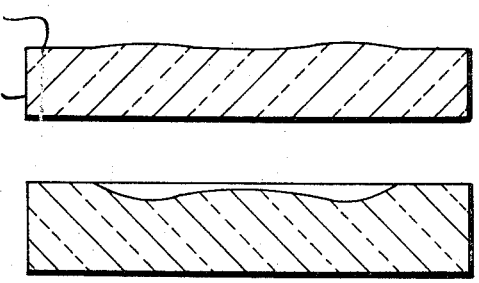
Figure 5:
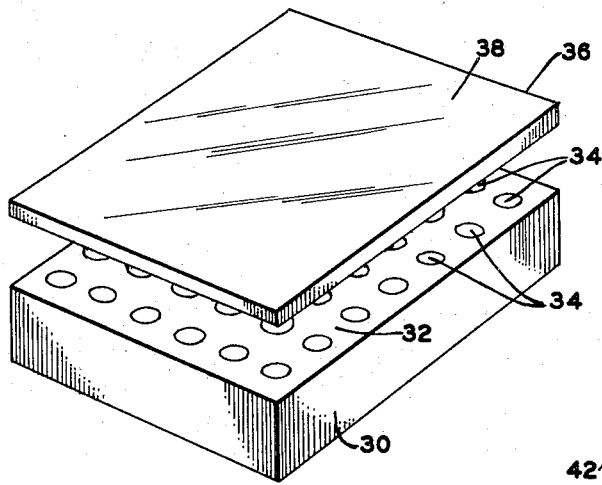
Figure 6:
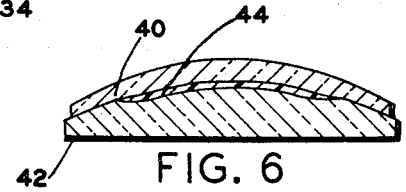

FIG. 4 is a view generally similar to the view of FIGS. 2 and 3, particularly showing the workpiece (numbered 16 and 18) after completion of the process;

FIG. 5 is a perspective view of a mold and a workpiece illustrating the simultaneous manufacture of a relatively large number of aspherically curved optical elements; and FIG. 6 is a cross-sectional view illustrating the manufacture of an aspherically curved meniscus type optical element.

Briefly, the invention contemplates utilizing the relatively strong contractile force generated by a cement as it freezes or cures to deform an optical workpiece in a controlled manner. The workpiece is stressed in a controlled manner so that the resulting strain distorts its surface. The distorted surface is then ground to a regular surface configuration such as plano, spherical, or circular cylindrical, while the strain is maintained by the cement. The cement is then released, and the workpiece resiles and assumes an aspheric configuration.

It is recognized that the principle of deforming an optical element by producing a strain in it in some way, and holding it so deformed while a selected surface is ground to a regular configuration has been previously suggested. The novelty of the present invention resides primarily in the use of a cement for stressing the workpiece. The practice of the present invention permits the achievement of a smoothly continuous, symmetrical, and accurately controllable strain, with a resulting improvement in surface control. The manufacture of aspherical optical elements according to the invention may be readily standardized and is relatively inexpensive.

The cement is confined within a cavity, one wall of which is constituted by the optical element to be aspherized. As the cement freezes, or cures, it contracts and distorts the optical element in accordance with the depth and shape of the cavity, the contraction characteristics of the cement, and the relative strengths of the optical element and the material forming the other walls of the cavity. The deformation of the workpiece is usually only a small fraction of the depth of the cavity, but is proportional thereto in a general way. This provides several processing advantages, one of which is the relatively high accuracy achievable due to the reduction ratio between the dimensions of the cavity and the workpiece deformation. The degree of workpiece deformation may be controlled to optical accuracy even though the cavity is made only with readily achievable mechanical accuracy.

Another advantage relates to the integrating, or averaging effect due to the strain distribution in the cement and the workpiece. This effect insures that the workpiece deformation will not correspond to relatively small, localized discontinuities or errors in the shape of the cavity. Further, an infinite number of control points is available for controlling the deformation, because the cement contacts the entire wall surface of the cavity. In addition, the infinite number of points at which stress is applied maximizes the absolute deformation attainable by avoiding abrupt changes of strain from point to point.

In general, high quality in an aspherical optical element means that the surface of the element must be symmetrical within about 10 microinches, or better; the average curve of the surface at all points must be smooth which means that all the mathematical derivatives of the surface curve must be continuous to a high degree; the surface obtained must approximate the specified curvature within .01%; and the surface finish must be of optical quality such that unpolish, "orange peel," and cosmetic blemishes should not be visible with a 10 power loupe, that is, the surface finish should be at least as good as the finish obtainable by standard optical finishing techniques as used for finishing plano and spherical optics.

These standards may all be met within acceptable cost limitations in the practice of the invention due to the inherent advantages thereof, which permit the use of conventional optical surface finishing techniques, together with the achievement of accurate control of surface configuration in the production of aspheric optical elements.

Referring now to the drawing, the process for aspherizing an initially plano optical element 16 according to the invention, starts with the preparation of a mold 10, one surface 12 of which is initially finished to conform closely to the surface 14 of the optical element opposite from the surface 18 that is to be aspherized. A shaped depression, or recess 20 is formed in the surface 12 of the mold. The shape and depth of the recess 20 is chosen in view of the curvature it is desired to impart to the surface 18 of the workpiece, and in view of the contraction characteristics of the cement to be used. In the example illustrated, the recess 20 is toroidal in shape. In other instances it may be spherical, or cylindrical, or any other shape required to produce the desired strain in the workpiece 16. The depth of the recess 20 will depend upon the cement characteristics and upon the relative strengths of the workpiece 16 and the mold 10. Because of the "demagnification" effect, due to the contraction characteristic of the cement, the depth of the recess is many times greater than the strain it is desired to impart to the workpiece. This effect is increased in those instances where the mold 10 is also appreciably strained. The recess 20, therefore, may be formed with a far lower degree of accuracy than is required in the finished workpiece.

For production work it will usually be preferred to make the mold 10 as rigid as possible so that substantially all of the strain resulting from the contraction of the cement will be in the workpiece 16. For experimental work, however, it is preferred to use a mold 10 having a strength about equal to the strength of the workpiece 16, so that the strain will be approximately equally divided between the workpiece 16 and the mold 10. Variations in the strain distribution, and thus in the surface curvature of the workpiece 16 may then be achieved during processing by removing stock from the exposed surface of the mold 10, thereby weakening the mold so that it takes more of the strain and the workpiece 16 takes less, thus reducing the aspheric curvature of the workpiece.

The recess 20 should be located upon the surface 12 with reasonable accuracy, but it need not be smoothly finished. It is preferably made as symmetrical as possible, but in view of the averaging effect due to the mass of the cement, the tendency toward symmetrical strain distribution in the workpiece 16, and the "demagnification" effect, relatively large errors are tolerable.

The entire surface 12 of the mold is covered with a cement 22, taking care to fill up the recess 20, and the workpiece 16 is then placed upon the mold and pressed against the mold surface 12. As the cement 22 cures, it contracts and stresses the workpiece and the mold, pulling them together in the region of the recess 20 and deforming the workpiece so that its exposed surface 18 becomes aspherically curved. The surface 18 is then ground and polished plano, and the cement 22 is removed by heating, or by an appropriate solvent, or otherwise. The workpiece 16 resiles, as shown in FIG. 4 upon release of the cement-induced stress, and the surface 18 assumes the desired aspheric configuration.

In a typical practical embodiment of the invention the mold 10 and the workpiece 16 may each be a disc of optical crown glass about eight millimeters in diameter and about one millimeter thick. The depth of the recess 20 in the mold may be about .0021 inch maximum, and about .0015 inch at the center. The aperture, or outer diameter of the recess 20 may be about 6.4 millimeters. A cement consisting essentially of cellulose caprate may then be used to produce an asphericity in the workpiece 16 totalling about four fringes on the interferometer, with relatively little curvature over the central portion of the workpiece.

The cellulose caprate is applied as a liquid at an elevated temperature, and cures by freezing. Preferably, in order to achieve maximum uniformity of strain distribution, the mold-cement-workpiece assembly is annealed for a period of several hours at an elevated temperature below the softening temperature of the cement before final cooling and surface grinding and polishing of the workpiece 16. Annealing insures maximum symmetry in the aspheric curvature of the workpiece.

Generally, for ease of removal, it is preferred to use a thermoplastic cement which may be removed by simple heating, although other cements may be used if desired. Satisfactory results have been achieved using sucrose octa acetate and epoxy resins, as well as with cellulose caprate. Most cements contract upon curing to a greater or lesser extent, and accordingly, all such cements capable of good surface adherence to glass, or other material of which the workpiece is made may be utilized in the practice of the invention. The material of the mold may be selected in light of the cement characteristics for desired adherence. It has been found that optimum results may be most easily achieved through the use of relatively hard cements, which are generally those having relatively high softening points. The relatively hard cements appear to be more stable than the softer ones, and to retain the workpiece deformation at a more constant value during processing.

FIG. 5 illustrates the simultaneous manufacture of plural aspherical elements according to the invention. As shown therein, a mold 30 is prepared of slate, granite, glass, cast iron or other relatively rigid material. The upper surface 32 of the mold is smoothly finished, initially flat. Recesses 34 are then formed in the surface 32, each one of the recesses 34 being shaped according to the principles hereinabove described for deforming a single optical element. In the example shown the recesses 34 are spherical curved, but they may be toroidal, elliptical, or of other shape depending upon the particular aspheric curvature it is desired to impart to the optical elements.

The mold surface 32 is covered with a cement (not shown) which fills the recesses 34, and a flat sheet 36 of glass, or other optical material is placed upon the cement. As the cement freezes, it deforms the sheet 36, producing separate aspheric curvatures in the various portions thereof corresponding to the respective recesses 34. The cemented assembly is annealed, and then the exposed, outer surface 38 of the sheet is ground plano. The sheet 36 is then removed by melting the cement or dissolving it, and cut in order to separate the various aspherically curved portions, each one of which constitutes a separate aspheric element.

Aspherizing a meniscus type optical element 40 is illustrated in FIG. 6. The process is exactly similar to the process illustrated in FIGS. 1–4, except that the mold 42 is convexly curved to match the concave curface of the element 40, and the convex surface of the element 40 is spherically ground while the element is held in strain by the cement. The recess 44 is shaped, similarly to the recess 20 shown in FIGS. 1–4, to produce the desired strain in the workpiece 40. In FIG. 6, the workpiece 40 is shown as it appears after surface grinding and polishing to a spherical curvature, and while it is still held in strain by the cement 44.

While the practice of the invention has been illustrated in connection with worpieces made of glass, it is equally applicable for application to workpieces made of other materials such as metals, ceramics, and organic materials. It is only necessary to restrict the strain to a value below the elastic limit of the workpiece, thereby to insure that it will resile to its initial condition of strain upon release of the cement. In the event relatively large deformations are required in a relatively brittle workpiece such as one of glass, the workpiece should be made relatively thin to minimize the stress required to achieve the desired deformation and thus to avoid breakage.

What is claimed is:

1. A method of aspherizing an optical element comprising cementing a major surface of said element to another surface of a generally similar but different configuration from said major surface and inducing a strain in said element, grinding the surface of said element opposite from said major surface to a predetermined configuration while said major surface remains cemented to said other surface and said element is under a strained condition, and thereafter releasing said element from said other surface and releasing the strain in said element.

2. Method of aspherizing an optical element comprising making a mold having a working surface conforming closely to a major surface of said element, forming a recess in said working surface, covering said working surface with a cement in sufficient quantity to fill said recess, placing said major surface upon said cement over said recess, curing said cement to bond said element to said mold and thereby to induce strain in said element due to shrinkage of said cement, grinding the surface of said element opposite from said major surface to a predetermined configuration while said element is so strained, and thereafter releasing said element from said mold.

3. Method of aspherizing an optical element comprising making a mold having a working surface conforming closely to a major surface of said element, said mold being at least as rigid as the element to be aspherized, forming a recess in said working surface, covering said working surface with a cement in sufficient quantity to fill said recess, placing said major surface upon said cement over said recess, curing said cement to bond said element to said mold and thereby to induce strain in said element due to shrinkage of said cement, grinding the surface of said element opposite from said major surface to a pre-determined configuration while said element is so strained, and thereafter releasing said element from said mold.

4. Method of aspherizing an optical element comprising making a mold having a working surface conforming closely to a major surface of said element, said mold being much more rigid than said element, forming a recess in said working surface, covering said working surface with a cement in sufficient quantity to fill said recess, placing said major surface upon said cement over said recess, curing said cement to bond said element to said mold and thereby to induce strain in said element due to shrinkage of said cement, grinding the surface of said element opposite from said major surface to a predetermined configuration while said element is so strained, and thereafter releasing said element from said mold.

5. Method of aspherizing an optical element comprising making a mold having a working surface conforming closely to a major surface of said element, forming a toroidal recess in said working surface, said recess being smaller than said major surface of the element to be aspherized, covering said working surface with a cement in sufficient quantity to fill said recess, placing said major surface upon said cement over said recess, curing said cement to bond said element to said mold and thereby to induce strain in said element due to shrinkage of said cement, grinding the surface of said element opposite from said major surface to a predetermined configuration while said element is so strained, and thereafter releasing said element from said mold.

6. Method of making plural aspheric optical elements comprising making a relatively rigid mold having a flat working surface, forming a plurality of spaced recesses in said working surface, covering said working surface with a cement in sufficient quantity to fill said recesses, placing an optical blank upon said cement over said recesses, said blank having an initially flat surface in contact with said cement, curing said cement to bond said blank to said mold and thereby to induce strain in said blank due to shrinkage of said cement, grinding the surface of said blank opposite from said cement to a planar configuration while said blank is so strained, thereafter releasing said blank from said mold, and dividing said blank in accordance with the spacing of said recesses to form separate aspheric elements of said blank.

7. Method of aspherizing an optical element comprising curing a mass of cement in contact with one major face of said element while supporting the surface of said mass of cement opposite from said element in a selected predetermined configuration differing from the configuration of said major surface of the element whereby the shrinkage of the cement as it cures stresses and strains said element causing a predetermined distortion of said element, grinding the surface of said element opposite from said major surface to a predetermined regular surface configuration while said element is held strained by said cement, and thereafter removing said cement from said major surface and releasing the strain and distortion in said element.

8. Method of aspherizing an optical element comprising cementing with a thermoplastic cement a major surface of said element to another surface of different configuration from said major surface causing an irregular configuration on the surface of said element opposite said major surface due to shrinkage of said cement, grinding the surface of said element opposite from said major surface to a predetermined regular configuration while said major surface remains cemented to said other surface, and thereafter releasing said element from said other surface by heat softening said thermoplastic cement and permitting the major surface to return to its original configuration.

9. Method of aspherizing an optical element comprising placing a major surface of said element upon another surface of different configuration from said major surface with a fused thermoplastic cement therebetween, curing said cement by cooling it thereby to bond said major surface to said other surface and to strain said element by reason of contraction of said cement, annealing said cement by maintaining it at an elevated temperature after said curing step to minimize localized stresses and strains, said elevated temperature being below the recognized softening temperature of said cement, grinding the surface of said element opposite from said major surface to a pre-determined configuration while said major surface remains cemented to said other surface, and thereafter heat softening said cement to release said element from said other surface.

References Cited in the file of this patent

UNITED STATES PATENTS

| | | |
|---|---|---|
| 1,589,787 | Butler | June 22, 1926 |
| 2,368,085 | Barbieri | Jan. 30, 1945 |
| 2,393,073 | Tenny | Jan. 15, 1946 |
| 2,482,698 | Tillyer | Sept. 20, 1949 |